United States Patent [19]

Carosino

[11] Patent Number: 4,534,237

[45] Date of Patent: Aug. 13, 1985

[54] SHIFT CONTROLLER

[76] Inventor: Paul J. Carosino, 11245 E. Marginal Way South, Seattle, Wash. 98168

[21] Appl. No.: 539,329

[22] Filed: Oct. 5, 1983

[51] Int. Cl.³ .............................................. G05G 9/12
[52] U.S. Cl. ..................................................... 74/476
[58] Field of Search .................................. 74/476, 477

[56] References Cited

U.S. PATENT DOCUMENTS

| | | | |
|---|---|---|---|
| 1,250,355 | 12/1917 | Robinson et al. | 74/476 |
| 3,602,061 | 8/1971 | Nemiroff | 74/476 |
| 4,067,423 | 1/1978 | Schneider et al. | 74/476 X |
| 4,126,055 | 11/1978 | Forsyth | 74/476 |
| 4,255,984 | 3/1981 | Abels et al. | 74/476 X |
| 4,381,682 | 5/1983 | Kudo et al. | 74/476 |
| 4,455,885 | 6/1984 | Beig | 74/476 X |

Primary Examiner—William E. Tapolcai
Attorney, Agent, or Firm—Seed and Berry

[57] ABSTRACT

An apparatus for controlling gear changes when a shifter of a transmission is moved between a forward gear and a first reverse gear position, passing through a neutral position, for preventing changes of gear when the drive shaft is revolving. The controller includes a manually operable switch for selectively actuating the shifter to move it between the forward, neutral and reverse positions; a generator rotatably connected to the shaft for generating a rotation-indicating signal; a position-sensing relay for transmitting the rotation-indicating signal only when the shifter is in the neutral position; and a pair of disabling relays which, when in their normally closed state, allow the manual switch to control the movement of the shifter, but when the position-sensing relay is actuated, the rotation-indicating signal, after being passed through a signal processor, is used to energize the disabling relays and interrupt the actuation signal generated by the manual switch until the drive shaft stops rotating and the disabling relays are deactivated, returning control of the shifter to the manual switch.

20 Claims, 1 Drawing Figure

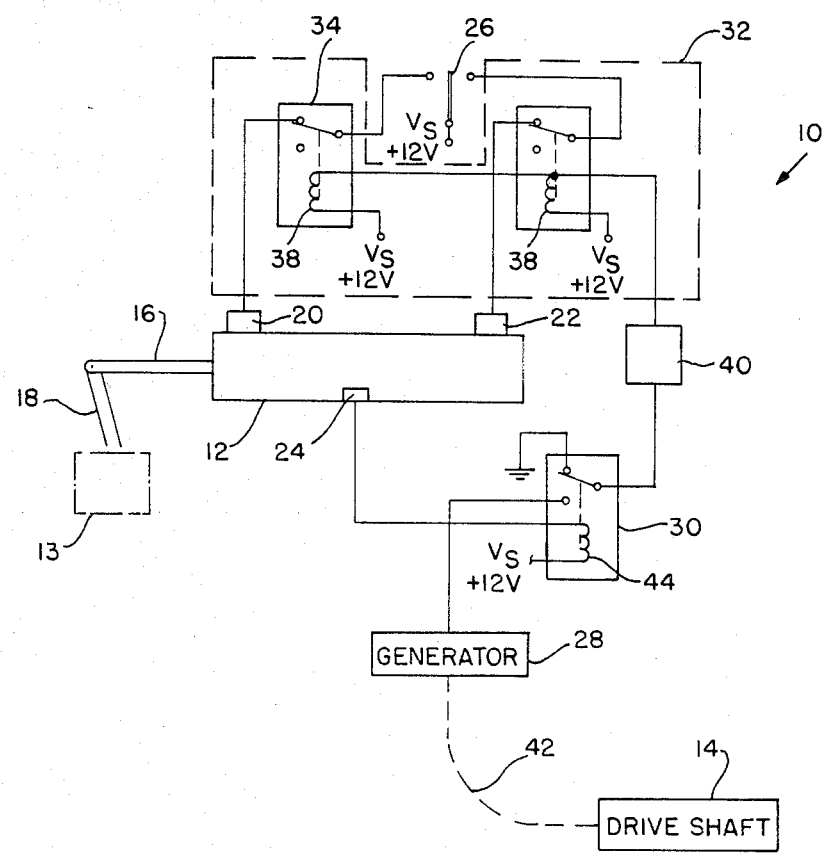

SHIFT CONTROLLER

DESCRIPTION

1. Technical Field

The present invention relates generally to gear-shifting mechanisms and, more particularly, to a controller for preventing damage to gears as a result of shifting gears while a driven shaft is rotating.

2. Background Art

In the past, the transmissions of trucks and other equipment have frequently been damaged by attempts to shift between forward and reverse gears while the drive shaft of the equipment is still turning. Sometimes, a mere delay before shifting is sufficient to allow the rotational momentum of the shaft to dissipate and the shaft to stop turning, whereupon a successful shift between forward and reverse gears may be accomplished. In some equipment, however, it is difficult to estimate the exact delay required, and the delay may vary, depending on the load driven by the drive shaft. Allowing an excessively long delay needlessly slows down the work being performed by the equipment. Furthermore, relying merely on a delay for shifting has not proven successful, in all instances, since the drive shaft may continue turning for reasons other than rotational momentum. For example, in trucks, the rotation may be caused by the truck coasting downhill, or in equipment, the rotation may be caused by the load on the equipment turning the shaft. One example of this latter problem involves a machine used to raise and lower pipes in a well. Even after the machine has been stopped and a significant delay has elapsed, the pipes may be descending under their great weight and slowly turning the drive shaft, in which case an attempt to shift the gears of the machine to turn the shaft to raise the pipe will result in damage to the gears.

A similar problem results when attempting to engage an auxiliary device to a rotatable power takeoff shaft of an engine. If the shaft is rotating when an attempt is made to engage the auxiliary device, the engagement gears can be damaged. An example where such damage frequently occurs is in the engagement of a water pump on a fire truck to a power takeoff shaft driven by the engine of the truck. Another example is a refuse truck where the container-lifting device is engaged with a power takeoff shaft driven by the engine of the truck.

Since many existing trucks and other equipment provide no means for ensuring that a shift of gears, either between the forward and reverse gears or to engage auxiliary equipment, cannot occur while the drive shaft is still rotating, there is a great need for a device which may be retrofitted on this equipment to prevent attempts at shifting while the drive shaft is rotating but to allow shifting as soon as the shaft has ceased rotating. The same device may be employed as original equipment on newly manufactured trucks and other equipment. The present invention fulfills this need and further provides other related advantages.

DISCLOSURE OF INVENTION

The present invention resides in an apparatus for controlling gear changes when a shifter is moved between a first position whereat a drive shaft is turned in one direction and a second position whereat the drive shaft is turned in an opposite direction, with a neutral position therebetween through which the shifter is moved when going between the first and second positions. Basically, and in general terms, the apparatus of the invention includes a manually operable shift control for actuating the shifter to move the shifter between the first, neutral and second positions; rotation-sensing means for sensing rotation of the drive shaft and generating a rotation-indicating signal; position-sensing means for sensing positioning of the shifter, the position-sensing means inhibiting the rotation-indicating signal when the shifter is in the first or second position, and transmitting the rotation-indicating signal when the shifter is in the neutral position; and disable means for preventing actuation of the shifter by operation of the manual shift control, the disable means being responsive to the rotation-indicating signal to prevent actuation upon the rotation-sensing means sensing rotation of the drive shaft.

More specifically, in the presently preferred embodiment of the invention, the manual shift control is a manually operable switch for selectively generating an actuation signal to a first shifter actuator for moving the shifter in one direction, or to a second shifter actuator for moving the shifter in a second direction, the first and second shifter actuators moving the shifter between the first, neutral and second positions. The disable means includes a pair of controlled switches, each of the controlled switches being connected between the manually operable switch and one of the first and second shifter actuators for transmission of the actuation signal. The controlled switches are responsive to the rotation-indicating signal to interrupt transmission of the actuation signal upon the rotation-sensing means sensing rotation of the drive shaft.

The position-sensing means is a controlled switch connected between the rotation sensing means and the disable means, the controlled switch being responsive to the positioning of the shifter to transmit the rotation-indicating signal when the shifter is in the neutral position. The rotation-sensing means may be a generator connected for rotation with the drive shaft, and generating the rotation-indicating signal. The generator may be connected directly or indirectly to the drive shaft by a rotatable, flexible cable. The apparatus may further include signal-processing means for receiving and processing the output signal of the generator to produce the rotation-indicating signal.

The controlled switches of the disable means include a pair of relays, with the manually operable switch connected to one contact of a pair of normally closed contacts of each relay of the pair, and the first shifter actuator connected to the other contact of the pair of normally closed contacts of one relay and the second shifter actuator connected to the other contact of the pair of normally closed contacts for the other relay. Each of the pairs of relays has a coil controlled by the rotation-indicating signal, with the pairs of normally closed contacts staying closed until the coils are energized in response to the rotation-indicating signal indicating rotation of the shaft, whereupon the normally closed contacts are opened and transmission of the actuation signal to the first and second shifter actuators is interrupted.

The controlled switch of the position-sensing means is a third relay, having a pair of normally open contacts, one contact of the pair being connected to the rotation-sensing means and the other contact of the pair of normally open contacts being connected to the coils of the disable means relays. The third relay has a coil controlled by a neutral signal provided by the shifter indicating positioning of the shifter in the neutral position. The pair of normally open contacts stays open until the coil is energized in response to the neutral signal, whereupon the open contacts are closed and the rotation-indicating signal is transmitted to the coils of the disable means relays to energize the coils and open the normally closed contacts of the relays.

The apparatus of the present invention may also be used for engagement of gears when a shifter is moved between a first position whereat a shaft is rotatably driven and a neutral position whereat the shaft is not driven, utilizing a manually operable shift control for actuating the shifter to move the shifter between the first and neutral positions; rotation-sensing means for sensing rotation of the shaft and generating a rotation-indicating signal; and disable means for preventing actuation of the shifter by operation of the manual shift control for movement from the neutral position to the first position by engagement of the gears, the disable means being responsive to the rotation-indicating signal to prevent actuation upon the rotation-sensing means sensing rotation of the shaft.

Other features and advantages of the invention will become apparent from the following detailed description, taken in conjunction with the accompanying drawings.

BRIEF DESCRIPTION OF THE DRAWING

FIG. 1 is a schematic drawing of the shift controller embodying the present invention.

BEST MODE FOR CARRYING OUT THE INVENTION

As shown in the drawings for purposes of illustration, the present invention is embodied in a gear shift controller, indicated generally by reference numeral 10. The controller 10 controls the operation of a shifter 12 which shifts or changes the gears of a transmission or the like 13 connected to a rotatable drive shaft 14. The shifter 12 is shown in FIG. 1 as a conventional linear shifter with an extendible arm 16 which engages a gear shift lever 18 of the transmission 13. The gears of the transmission 13 are changed by the shifter 12 extending or retracting the arm 16 through the action of an electrically controlled, forward driving solenoid 20 which extends the arm and an electrically controlled reverse driving solenoid 22 which retracts the arm. Under the influence of the solenoids 20 and 22, the arm 16 of the shifter 12 may be moved into positions corresponding to the forward gear positions, the neutral position, or the reverse gear positions of the transmission 13. To move the shifter 12 from a position corresponding to one of the forward gear positions of the transmission 13 to a position corresponding to one of the reverse gear positions of the transmission, the shifter must be moved through the neutral position. The shifter 12 is provided with a neutral position switch 24 which provides an electrical ground on its output terminal when the shifter is placed in the neutral position.

In accordance with the invention, the controller 10 includes a manually operable switch 26 for actuating the shifter 12 to move the shifter between its forward, neutral and reverse positions; a rotation-sensing device 28 for sensing rotation of the drive shaft 14 and generating a rotation-indicating signal; a position-sensing device 30 for sensing positioning of the shifter to inhibit the rotation-indicating signal when the shifter is in one of its forward or reverse positions and to transmit the rotation-indicating signal when the shifter is in the neutral position; and a disabling device 32 responsive to the rotation-indicating signal for preventing actuation of the shifter by operation of the manual switch upon the rotation-sensing device sensing rotation of the drive shaft. The controller 10 operates to permit gear changes among the forward gears or among the reverse gears, but will prevent gear changes between the forward and reverse gears unless the drive shaft stops revolving with the shifter moved into the neutral position in preparation for changing between the forward and reverse gears.

In the presently preferred embodiment of the invention, the manually operable switch 26 selectively generates an actuation signal to the forward and reverse driving solenoids 20 and 22 by applying system voltage $V_s$ to the solenoids. The system voltage $V_s$ is shown in the drawings as +12 volts and is obtained from the battery supply of the equipment to which the controller is connected. It is to be understood that the controller 10 may be designed to operate on other voltages, and from its own or another source of power.

The manual switch 26 is a single-pole, double-throw toggle switch with its common terminal connected to the system voltage $V_s$. Each of the other two terminals of the switch 26 is connected to one of a pair of disabling relays 34 and 36 comprising the disabling device 32. The disabling relays 34 and 36 are single-pole, double-throw relays each have a pair of normally closed contacts, with the common terminal of each of the relays connected to one or the other terminals of the manual switch 26 for selective connection with the supply voltage $V_s$ upon actuation of the switch. The other terminal of the normally closed contacts of the one disabling relay 34 is connected to the forward driving solenoid 20, and the other terminal of the normally closed contacts of the other disabling relay 36 is connected to the reverse driving solenoid 22. The disabling relays 34 and 36 each have a coil 38 and are activated by energizing the coil to open the normally closed contacts. One terminal of each of the coils 38 is connected to the system voltage $V_s$, and the other terminal of each coil is connected in parallel to a signal processor 40. The signal processor 40 is of conventional design and processes the rotation-indicating signal to provide it with electrical characteristics sufficient to energize the coils when indicating the drive shaft 14 is rotating.

The rotation-sensing device 28 is an electrical generator mechanically coupled to the drive shaft 14 through a flexible cable 42 for rotation with the drive shaft. Alternatively, the flexible cable could be connected to the speedometer cable or any other mechanism which rotates with the drive shaft. The output signal of the generator 28 is the rotation-indicating signal and is produced whenever the drive shaft 14 rotates.

The position-sensing device 30 is a single-pole, double-throw relay having a pair of normally open contacts. The common terminal of the position-sensing relay 30 is connected to the signal processor 40. The other terminal of the pair of normally open contacts is connected to the output of the generator 28. The position-sensing relay 30 has a coil 44 with one terminal connected to the system voltage $V_s$ and the other terminal connected to the neutral position switch 24. The coil 44 is energized when the shifter 12 is moved into the neutral position, with the neutral position switch 24 providing an electrical ground to the coil, whereupon the pair of normally open contacts are closed and the rotation-indicating signal of the generator 28 is transmitted to the signal processor 30 and thence to the coils 38 of the disabling relays 34 and 36 to energize those coils. The normally closed contact of the position-sensing relay 30 is connected to electrical ground to prevent the signal processor 40 from sending spurious signals to the disabling relays 34 and 36.

In operation, the controller 10 permits the manually operable switch 26 to transmit actuation signals to the forward driving solenoid 20 for moving the shifter 12 towards the forward direction, or to the reverse driving solenoid 22 for moving the shifter towards the reverse direction, even while the drive shaft 14 is rotating, unless the shifter is moved to the neutral position, as it must be for a shift of gears between the forward and reverse gears. Consequently, the shifter may be freely moved along the various forward gears or the various reverse gears, if more than one, without restriction by the controller 10, using whatever synchromesh device is built into the transmission 13.

When the shifter 12 is moved into the neutral position, however, the neutral position switch 24 energizes the coil 44 of the position-sensing relay 30 and closes the normally open contacts to transmit the rotation-indicating signal produced by the generator 28 through the signal processor 40 to the coils 38 of the disabling relays 34 and 36. If the drive shaft 14 is rotating, the rotation-indicating signal causes the coils 38 of the disabling relays 34 and 36 to be energized and the normally closed contacts of the relays to be opened, thus preventing further transmission of the actuation signal generated by the manually operable switch 26 to either of the driving solenoids 20 and 22. This prevents the shifter 12 from moving out of the neutral position and shifting the transmission 13 into gear while the drive shaft 14 is revolving, avoiding damage to the transmission.

When the drive shaft 14 stops revolving, the generator 28 stops producing the rotation-indicating signal, the coils 38 of the disabing relays 34 and 36 are thereby deactivated, and the normally closed contacts of the relays are returned to their normally closed positions. This reestablishes control over the shifter 12 by the manually operable switch 26 and the switch may now be operated to transmit an actuation signal to one of the driving solenoids 20 or 22 to move the shifter from the neutral position to one of the forward or reverse positions without damaging the transmission as a result of the gear change.

A simpler version of the controller (not shown) may be utilized for controlling engagement of gears when a shifter is moved between a first position whereat a shaft is rotatably driven and a neutral position whereat the shaft is not driven, using the same manually operable shift switch and rotation-sensing device described above. In this embodiment, however, only one disabling relay need be used to prevent the driving solenoid which moves the shifter from the neutral position to the drive position from being actuated by the manual switch when the shaft is rotating.

It will be appreciated that, although specific embodiments of the invention have been described herein for purposes of illustration, various modifications may be made without departing from the spirit and scope of the invention. Accordingly, the invention is not limited except as by the appended claims.

I claim:

1. An apparatus for controlling gear changes when a shifter is moved between a first position whereat a drive shaft is turned in one direction and a second position whereat said drive shaft is turned in an opposite direction, with a neutral position therebetween through which said shifter is moved when going between said first and second positions, comprising:
    a manually operable shift control for actuating said shifter to move said shifter between said first, neutral and second positions;
    rotation-sensing means for sensing rotation of said drive shaft and generating a rotation-indicating signal;
    position-sensing means for sensing positioning of said shifter, said position-sensing means inhibiting said rotation-indicating signal when said shifter is in said first or second positions, and transmitting said rotation-indicating signal when said shifter is in said neutral position; and
    disable means for preventing actuation of said shifter by operation of said manually operable shift control, said disable means being responsive to said rotation-indicating signal to prevent actuation of said shifter upon said rotation-sensing means sensing rotation of said drive shaft, whereby the apparatus will prevent gear changes between said first and second shifter positions unless said drive shaft has stopped revolving when said shifter is in said neutral position.

2. The apparatus of claim 1 wherein said manually operable shift control is a manually operable switch for selectively generating an actuation signal to a first shifter actuator for moving said shifter in one direction, or to a second shifter actuator for moving said shifter in a second direction, said first and second shifter actuators moving said shifter between said first, neutral and second positions, and said disable means includes a pair of controlled switches, each of said controlled switches being connected between said manually operable switch and one of said first and second shifter actuators for transmission of said actuation signal, said controlled switches being responsive to said rotation-indicating signal to interrupt transmission of said actuation signal upon said rotation-sensing means sensing rotation of said drive shaft.

3. The apparatus of claim 1 wherein said position-sensing means is a controlled switch connected between said rotation-sensing means and said disable means, said controlled switch being responsive to positioning of said shifter to transmit said rotation-indicating signal when said shifter is in said neutral position.

4. The apparatus of claim 1 wherein said rotation-sensing means is a generator connected for rotation with said drive shaft, and generating said rotation-indicating signal.

5. The apparatus of claim 4 wherein said generator is connected directly or indirectly to said drive shaft by a rotatable, flexible cable.

6. The apparatus of claim 4, further including signal-processing means for receiving and processing an output signal of said generator to produce said rotation-indicating signal.

7. An apparatus for controlling operation of a shifter used for shifting a transmission or the like connected to a rotatable shaft between at least one forward gear, neutral and at least one reverse gear, said shifter moving between a first position corresponding to said forward gear, and a second position corresponding to said reverse gear, movement between said first and second positions passing through a neutral position corresponding to said neutral, said shifter having a first actuator for movement of said shifter toward said first position and a second actuator for movement of said shifter toward said second position, comprising:
  a manually operable shift control for selectively actuating said first or second actuators to move said shifter between said first, neutral and second positions;
  a rotation sensor for sensing rotation of said shaft and generating a rotation-indicating singal;
  a position sensor for sensing the position of said shifter, said position sensor inhibiting said rotation-indicating signal when said shifter is in said first or second positions, and transmitting said rotation-indicating signal when said shifter is in said neutral position; and
  a disabler for preventing actuation of said first or second actuators by operation of said manually operable shift control, said disabler being responsive to said rotation indicating signal to prevent actuation of said shifter upon said rotation-indicating signal indicating rotation of said shaft, whereby the apparatus will permit gear changes among said forward gears or said reverse gears, but will prevent gear changes between said forward and reverse gears unless said shaft stops revolving with said shifter moved into said neutral position in preparation for changing between said forward and reverse gears.

8. The apparatus of claim 7 wherein said manually operable shift control is a manually operable switch for selectively generating an actuation signal to said first or second actuators, and said disabler includes a pair of controlled switches connected one between said manually operable switch and each of said first and second actuators for transmission of said actuation signal, said controlled switches being responsive to said rotation-indicating signal to interrupt transmission of said actuation signal upon said rotation-indicating signal indicating rotation of said shaft.

9. The apparatus of claim 8 wherein each said controlled switch includes a relay, with said manually operable switch connected to one contact of a pair of normally closed contacts of each relay, and said first actuator connected to the other of said pair of normally closed contacts of one relay and said second actuator connected to the other contact of said pair of normally closed contacts for the other relay, each of said relays having a coil controlled by said rotation-indicating signal, said pairs of normally closed contacts staying closed until said coils are energized in response to said rotation-indicating signal indicatng rotation of said shaft, whereupon said normally closed contacts are opened and transmission of said actuation signal to said first and second actuators is interrupted.

10. The apparatus of claim 9 wherein said position sensor is a third relay having a pair of normally open contacts, one contact of said pair of normally open contacts being connected to said rotation sensor and the other contact of said pair of normally open contacts being connected to said coils of said relays of said controlled switches, said third relay having a coil controlled by a neutral signal indicating positioning of said shifter in said neutral position, said pair of normally open contacts staying open until said coil is energized in response to said neutral signal, whereupon said open contacts are closed and said rotation-indicating signal is transmitted to said coils of said disabler relays to energize said coils.

11. The apparatus of claim 7 wherein said position sensor is a controlled switch connected between said rotation sensor and said disabler, said controller switch being responsive to positioning of said shifter to transmit said rotation-indicating signal when said shifter is in said neutral position.

12. The apparatus of claim 11 wherein said controlled switch is a relay having a pair of normally open contacts, one contact of said pair of normally open contacts being connected to said rotation sensor and the other contacts of said pair of normally open contacts being connected to said disabler, said relay having a coil controlled by a neutral signal indicating positioning of said shifter in said neutral position, said pair of normally open contacts staying open until said coil is energized in response to said neutral signal, whereupon said open contacts are closed and said rotation-indicating signal is transmitted to said disabler.

13. The apparatus of claim 7 wherein said rotation sensor is a generator rotatably connected to said shaft for generating said rotation-indicating signal.

14. The apparatus of claim 13 wherein said generator is connected directly or indirectly to said shaft by a flexible cable.

15. The apparatus of claim 13, further including a signal processor for receiving and processing an output signal of said generator to produce said rotation-indicating signal.

16. An apparatus for controlling engagement of gears when a shifter is moved between a first position whereat a shaft is rotatably driven and a neutral position whereat said shaft is not driven, comprising:
  a manually operable shift control for actuating said shifter to move said shifter between said first and neutral positions;
  rotation-sensing means for sensing rotation of said shaft and generating a rotation-indicating signal; and
  disable means for preventing actuation of said shifter by operation of said manually operable shift control for movement from said neutral position to said first position, said disable means being responsive to said rotation-indicating signal to prevent actuation of said shifter upon said rotation-sensing means rotation of said shaft, whereby the apparatus will prevent gear engagement by moving said shifter from said neutral position to said first position, unless said drive shaft has stopped revolving.

17. The apparatus of claim 16 wherein said manually operable shift control is a manually operable switch for selectively generating an actuation signal to a first shifter actuator for moving said shifter from said neutral position to said first position, or to a second shifter actuator for moving said shifter from said first position to said neutral position, and said disable means is a relay connected between said switch and said first shifter actuator for transmission of said actuation signal, said relay being responsive to said rotation-indicating signal to energize said relay and interrupt transmission of said actuation signal upon said rotation-sensing means sensing rotation of said drive shaft.

18. The apparatus of claim 16, wherein said rotation-sensing means is a generator rotatably connected to said shaft for generating said rotation-indicating signal.

19. The apparatus of claim 18 wherein said generator is connected directly or indirectly to said shift by a flexible cable.

20. The apparatus of claim 18, further including signal-processing means for receiving and processing an output signal of said generator to produce said rotation-indicating signal.

* * * * *